United States Patent
Ziegler et al.

[11] Patent Number: 6,017,505
[45] Date of Patent: Jan. 25, 2000

[54] METHOD OF PRODUCING INORGANIC AEROGELS UNDER SUBCRITICAL CONDITIONS

[75] Inventors: Bernd Ziegler, Ludwigshafen; Thomas Gerber, Rostock, both of Germany

[73] Assignee: BASF Aktiengesellschaft, Ludwigshafen, Germany

[21] Appl. No.: 09/051,090

[22] PCT Filed: Sep. 30, 1996

[86] PCT No.: PCT/EP96/04250

§ 371 Date: Apr. 14, 1998

§ 102(e) Date: Apr. 14, 1998

[87] PCT Pub. No.: WO97/13721

PCT Pub. Date: Apr. 17, 1997

[30] Foreign Application Priority Data

Oct. 14, 1995 [DE] Germany ............................ 195 38 333

[51] Int. Cl.[7] ............................ C01B 33/00; C01B 33/26; C01B 33/12; C01B 33/20

[52] U.S. Cl. ............................ 423/338; 423/324; 423/325; 423/326; 423/330.1; 423/335; 423/336; 423/337

[58] Field of Search ........................ 423/324, 325, 423/326, 330.1, 335, 336, 337, 338

[56] References Cited

U.S. PATENT DOCUMENTS 3,672,833  6/1972  Teichner et al. .

FOREIGN PATENT DOCUMENTS

| | | |
|---|---|---|
| 0199 930 | 11/1986 | European Pat. Off. . |
| 0255 000 | 2/1988 | European Pat. Off. . |
| 0171722BI | 6/1994 | European Pat. Off. . |
| 1811353 | 11/1968 | Germany . |
| 3924244A1 | 7/1989 | Germany . |
| 4316540 | 11/1994 | Germany . |
| WO 93/13024 | 7/1993 | WIPO . |
| WO 94/25149 | 11/1994 | WIPO . |
| WO 94/26406 | 11/1994 | WIPO . |
| WO 95/06617 | 3/1995 | WIPO . |
| WO 95/17347 | 6/1995 | WIPO . |
| WO 96/22942 | 8/1996 | WIPO . |

OTHER PUBLICATIONS

Kistler, S.S., Coherent Expanded Aerogels, Phys. Chem., Bd. 36, 1932 S. 52–64.

*Primary Examiner*—Gary P. Straub
*Assistant Examiner*—Cam N. Nguyen
*Attorney, Agent, or Firm*—Oblon, Spivak, McClelland, Maier & Neustadt, P.C.

[57] ABSTRACT

Preparation of inorganic aerogels based on oxides of the metals magnesium, aluminum, silicon, tin, lanthanum, titanium, zirconium, chromium and/or thorium by producing a hydrogel in a sol/gel process, replacing the water in the hydrogel by an organic solvent, and drying the solvent-moist gel, takes place by conducting the drying step by exposing the solvent-moist gel to an ambient temperature which is above the boiling temperature of the solvent and at a pressure which is below the supercritical pressure of the solvent in such a way that the solvent within the gel is heated up very rapidly and evaporates.

30 Claims, 2 Drawing Sheets

METHOD OF PRODUCING INORGANIC AEROGELS UNDER SUBCRITICAL CONDITIONS

BACKGROUND OF THE INVENTION

1. Field of the Invention

The present invention relates to a new process for preparing inorganic aerogels on the basis of oxides of the metals magnesium, aluminum, silicon, tin, lanthanum, titanium, zirconium, chromium and/or thorium by producing a hydrogel by a sol/gel process, replacing the water in the hydrogel by an organic solvent, and drying the solvent-moist gel.

DESCRIPTION OF THE BACKGROUND

Aerogels are highly porous materials which consist generally of metal oxides and normally have a porosity >0.85 (in other words, for $SiO_2$, for example, a low density preferably in the range from 0.07 to 0.3 g/cm$^3$) and a very high internal surface area (in the case of $SiO_2$ generally from 700 to 1200 m$^2$/g). These properties make the aerogels outstandingly suitable as thermal and acoustic insulants and as catalyst supports.

The low density and high internal surface area are achieved by virtue of the hydrogel retaining its solids framework (metal oxide) on drying. The solid framework in the hydrogel comes about through aggregation processes which determine the corresponding properties (density, surface area). In general, the solid framework is described by fractal clusters. The aggregation clusters (solid framework, metal oxide) of the hydrogel are destroyed in the course of "simple" drying (heating of the untreated hydrogen under subcritical conditions) owing to the action of capillary forces and the condensation of the internal surface ($2M_{surface}$-OH→$M_{bulk}$-O-$M_{bulk}$+$H_2O$). A xerogel is formed, whose internal surface area in the case, for example, of $SiO_2$ is in the range of 25–700 m$^2$/g and whose density is in the range above 1.0 g/cm$^3$.

Prior art preparation of inorganic aerogels proceeds by one of two fundamentally different routes.

On the one hand, supercritical drying processes are employed. This prevents the action of the capillary forces, since the phase transition liquid/gaseous is avoided by an appropriate temperature and pressure regime. The drying procedure starts from solvent-containing gels that are obtained by exchange of the original solvent, usually water. Solvents employed in this context are alcohols (methanol, ethanol, propanol) or liquid carbon dioxide (Phys. Chem. 36, (1932) 52–64; EP-A-171 722; DE-A-18 11 353; U.S. Pat. No. 3,672,833; DE-A-39 24 244; WO-A-95/06617). Because of the use of autoclaves, the processes are very cost-intensive.

On the other hand, there are also processes in existence in the prior art which permit the subcritical drying of aerogels.

The key feature of the process of WO-A15/25149 is an enlargement in the contact angle between solvent an solid framework. This reduces the capillary pressure, and the structure of the moist gel is retained almost completely on drying. The changing contact angle is achieved by modifying the internal surface of the solid framework in the moist gel by reaction with a compound of the formula $R_xMX_y$, where M is the metal of the solid oxide, R is an organic group and X is a halogen. Subcritical drying of the gel, which is also subjected to mulitple solvent exchange, is carried out very slowly, in stages, and so renders the process described, together with the modification step lasting about 4 days, very time-consuming.

In the process of WO-A-94/26406 an $SiO_2$ aerogel is produced, following surface modification with trimethylchlorosilane and multiple solvent exchange, with the aid of a dielectric drying procedure (microwave drying, high-frequency drying). Dielectric drying, however, is highly expensive in terms of energy and apparatus and must be matched precisely to the particular gel.

SUMMARY OF THE INVENTION

It is an object of the present invention to prepare inorganic aerogels, especially $SiO_2$ aerogels, in a process which is shorter than those of the prior art, is less technically complex, and hence is cost-effective.

We have found that this object is achieved by a process for preparing inorganic aerogels based on oxides of the metals magnesium, aluminum, silicon, tin, lanthanum, titanium, zirconium, chromium and/or thorium by producing a hydrogel in a sol/gel process, replacing the water in the hydrogel by an organic solvent, and drying the solvent-moist gel, which comprises conducting the drying step by exposing the solvent-moist gel to an ambient temperature which is above the boiling temperature of the solvent and at a pressure which is below the supercritical pressure of the solvent in such a way that the solvent within the gel is heated up very rapidly and evaporates.

DETAILED DESCRIPTION OF THE INVENTION

Since the materials obtained in the process of the invention have aerogel properties (high porosity, low density, high internal surface area) but are not comparable with the xerogels obtained by "simple" subcritical drying, the term xerogels is used for the materials of the invention although they are not prepared, like the materials commonly termed aerogels, by supercritical drying.

In the case of the subcritical drying of the invention the ambient temperature (drying temperature) is preferably chosen such that the temperature in the solvent-moist gel owing to the transition of the solvent from the liquid to the gaseous phase lies below the pyrolysis temperature of the solvent.

The ambient temperature can lie above or below the critical temperature of the solvent, but is preferably much higher than the boiling temperature of the solvent at the corresponding pressure, so that the solvent within the gel heats up with great rapidity. The ambient pressure is always lower than the critical pressure. It is preferred to carry out drying at atmospheric pressure, although a temperature slightly below atmospheric can also be employed for drying.

Suitable ambient temperatures are generally from 150 to 300° C., preferably from 200 to 300° C. and, with particular preference, from 250 to 300° C.; in other words, the ambient temperatures are generally from 130 to 330° C., in particular from 150 to 300° C. and, especially, from 200 to 250° C. above the boiling temperature of the solvent.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 1:
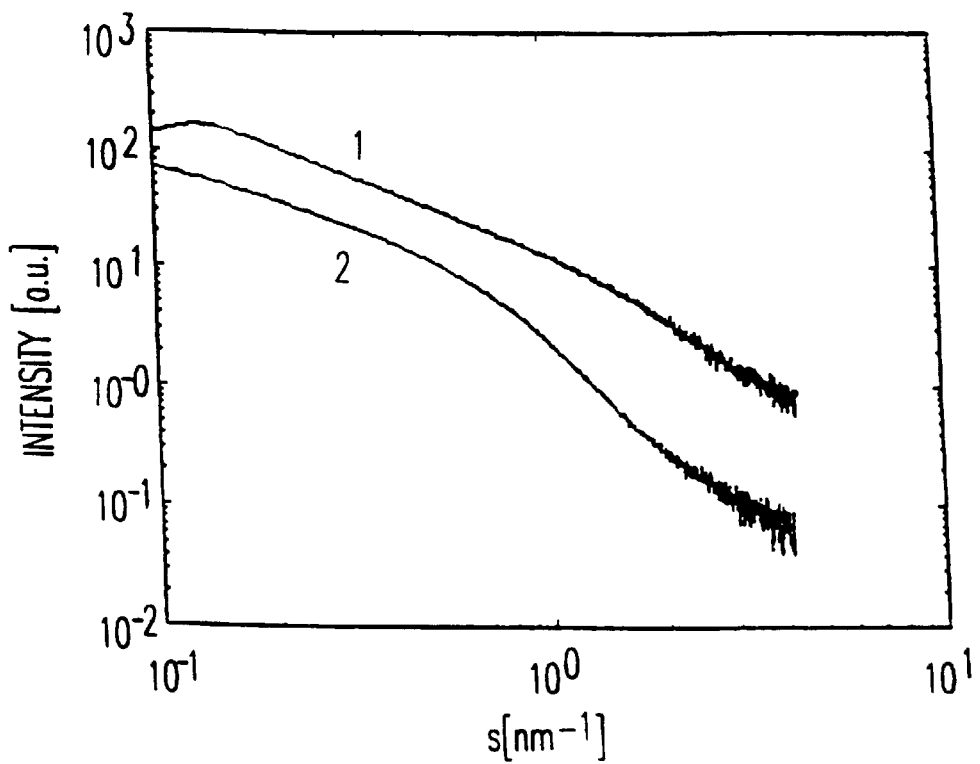
FIG. 1 is a plot of the small angle X-ray scattering of the hydrogel of Example 1 before and after treatment with polysilicic acid.

In the case of the drying step of the invention it is essential that the solvent—which should be anhydrous as far as possible—is removed from the gel very rapidly (generally within a few seconds) at very high temperatures. It could not have been foreseen that the solid framework of the gel would be substantially retained in the course of such rapid drying and would not collapse, and that condensation of the $Si_{surface}$-OH groups on the internal surface of the gel is largely suppressed, since in the prior art processes drying is always carried out very carefully and slowly at low temperatures and, moreover, with modification of the gel surface prior to drying.

The text below describes the individual steps of the novel process for preparing metal oxide aerogels in more detail, and deals in particular with the preparation of $SiO_2$ aerogels, for which the process of the invention possesses particular significance.

First of all, a customary sol/gel process is used to produce a hydrogel containing essentially no ionic constituents. One possible procedure here is to first of all free the aqueous solution of a hydrolyzable salt of the metal, in which the metal is present as metallate, from foreign metal cations with the aid of an acidic ion exchanger and then to convert this solution to the hydrogel by an appropriate pH regime. Alternatively, the hydrogel can be produced first and then freed from foreign ions by washing it with electrolyte-free water.

To facilitate and accelerate the drying process it is advantageous for the solvent-containing gel to be in the form of preferably spherical granules, since this permits rapid contacting of the gel with a surface that has been heated to the desired drying temperature (for example, rolling the granules on a hotplate or heating them in a preheated crucible in a likewise preheated oven); to avoid the ignition of the solvent vapors an inert gas can be employed. It is therefore advisable to prepare the hydrogel directly in the form of beads, by spraying the sol, or to subject the gel particles formed to subsequent mechanical comminution.

$SiO_2$ hydrogels can be prepared in accordance with the invention by, for example, passing a waterglass solution, especially a sodium waterglass solution, which generally contains from 0.5 to 6.5, preferably from 0.8 to 3.5 mol of $SiO_2/l$, through an acidic ion exchanger (replacing the sodium ions by protons) and then, by adding a base such as aqueous ammonia, establishing a pH of in general from 3 to 6.5, preferably from 5.5 to 5.9. By spraying the solution into a water-insoluble liquid having a density higher than that of the sol, such as liquid paraffin, it is possible to produce, directly, sol beads with diameters of about 1 to 15 mm, in particular about 3 mm, which gel as they drop to form hydrogel beads. If spraying is not employed, a compact gel mass is obtained within a few minutes.

Alternatively, $SiO_2$ hydrogels can be obtained as described in WO-A-95/06617, by mixing a waterglass solution with an acid, such as sulfuric acid, which estabishes a pH of in general from 7.5 to 11, preferably from 8.5 to 9.5. If a mixing nozzle is used for this purpose, the sol can be sprayed directly and solidifes while still in flight in the air to form hydrogel droplets which can then be washed with water to remove salt.

In order to reinforce the solid framework in the gel and hence to stabilize it for the solvent exchange and the drying operation, it can be judicious to subject the hydrogel to a redissolution process in the manner of an Ostwald ripening. For this purpose the gel must have a sufficiently high solubility in the surrounding liquid medium, which for ripening of $SiO_2$ hydrogel in water can be achieved by a suitable choice of pH and temperature. Ripening can take place by tempering (aging) alone or by tempering in the presence of a low molecular mass species of the solid that has a higher specific surface area than the solid framework.

In the ripening of $SiO_2$ hydrogel particles one possible procedure is to heat an aqueous suspension of the gel particles to a temperature of usually from 50 to 95° C., in the presence of low molecular mass polysilicic acid and at a pH of in general from 7 to 11.5, preferably from 9.5 to 10, which can be established and maintained by adding a base such as aqueous ammonia, and holding it at this temperature for a period of from about 0.1 to 3 h. Since the solubility of the $SiO_2$ particles is dependent on their radius, there is, accordingly, a redissolution process. In this procedure, the polysilicic acid can be added to the suspension continuously, or else the gel particles can be suspended directly in an aqueous solution of polysilicic acid.

"Pure" tempering can be performed by heating an aqueous suspension of the hydrogel particles, or the water-moist hydrogel mass, at from 50 to 95° C. and at a pH of $\leq 6$, preferably from 5 to 6, for a period of from about 0.5 to 5 h, preferably about 1 h, and likewise in a closed vessel.

The next step in the process of the invention for preparing aerogels is to replace as much as possible of the water present in the hydrogel by an organic solvent. The residual water content in the solvent-moist gel should, subsequently, be preferably <0.2, with particular preference <0.1 and, with very particular preference, <0.01% by volume.

Suitable solvents for this purpose are soluble in water and/or form an azeotrope with water, and therefore permit displacement of the water by flushing the hydrogel with the solvent in a through-flow apparatus, or by azeotropic distillation.

Preferred solvents are $C_1$–$C_6$ alcohols, such as methanol, ethanol, propanol, isopropanol, butanol, isobutanol, pentanol and hexanol, aliphatic $C_1$–$C_6$ carboxylic acid $C_1$–$C_8$-alkyl esters, especially $C_2$–$C_3$ carboxylic acid $C_1$–$C_3$-alkyl esters, such as methyl, ethyl and propyl acetate and methyl, ethyl and propyl propionate, and also toluene, acetone, chloroform and mixtures thereof.

Examples of suitable azeotropes are binary azeotropes, such as mixtures of butanol, isobutanol, pentanol, hexanol, ethyl acetate or toluene with water, and ternary azeotropes, such as mixures of water with ethanol and toluene, isopropanol and toluene or acetone and chloroform.

It must of course be ensured that the hydrogel is heated in sufficient organic solvent that the total amount of water can be distilled off. When using relatively small amounts of water-immiscible solvents, this can also be achieved by recycling the solvent.

For the subcritical drying step of the invention it is judicious if the gel contains a low-boiling solvent (boiling point generally <100° C., preferably <70° C. and, with particular preference, <60° C.) having a high vapor pressure, particular preference being given to solvents of low surface tension (especially <30 dyn/cm), since the latter enable drying to be carried out in a way which is both rapid and puts the least stress on the solid framework.

Examples of such solvents are $C_1$–$C_3$ alcohols, such as methanol, ethanol, propanol and isopropanol, diethyl ether, acetone, n-pentane and n-hexane, with methanol, acetone and n-pentane being particularly suitable.

If a relatively high-boiling solvent has been used to replace the water in the hydrogel it should therefore be replaced before drying by one of the above low-boiling solvents, a procedure which can be carried out in a simple manner by flushing. When acetone and chloroform, for example, are used to produce a ternary azeotrope, a further solvent exchange is of course unnecessary.

It is possible by this method to prepare, advantageously, $SiO_2$ aerogels having a density of in general from 0.2 to 0.3 g/cm³.

Where aerogels having densities <0.2 g/cm³ are to be produced, it is necessary to modify the internal surface of the solvent-moist gel obtained after water exchange, which prevents condensation of the $Si_{surface}$-OH groups, as follows $$2\ Si_{surface}\text{-OH} \rightarrow Si_{bulk}\text{-O-}Si_{bulk} + H_2O$$

in the course of drying.

Fundamental possibilities of surface modification are described in Iler, The Chemistry of Silica, John Wiley & Sons (1979) and in Journal of Polymer Science, Polymer Chemistry Edition 22, (1984) 3759.

The principle of surface modification is the reaction of the $Si_{surface}$-OH groups with a chemical compound which does not itself polymerize and which suppresses the above-described condensation of the $Si_{surface}$-OH groups with one another.

Preference is given for this purpose to an esterification of the Si-OH groups with $C_1$–$C_6$ alcohols (forming silicates) or a silylation by reaction with silanes of the formula $R^1_{4-n}Si(OR^2)_n$ or $R^1_{4-n}SiCl_n$, where n is 1 to 3 and $R^1$ and $R^2$ independently of one another are $C_1$–$C_6$-alkyl, cyclohexyl or phenyl, with hexamethyldisilazane or trimethylsilylacetamide.

It is also possible to carry out a reaction with tetrachlorosilane, after which the chlorine atoms are replaced by reaction with metal organyls (metals: e.g. lithium, zinc, aluminum, magnesium) containing the above-mentioned radicals $R^1$, or a reaction with titanium compounds of the formula $R^1_3TiCl$.

These reactions are illustrated on the basis of the following exemplary equations:

$Si_{surface}\text{-OH} + ROH \rightarrow Si_{surface}\text{-OR} + H_2O$ $Si_{surface}\text{-OH} + (CH_3)_2Si(OC_2H_5)_2 \rightarrow Si_{surface}\text{-O-Si}(CH_3)_2(OC_2H_5) + C_2H_5OH$ $Si_{surface}\text{-OH} + (CH_3)_2SiCl_2 \rightarrow Si_{surface}\text{-O-Si}(CH_3)_2Cl + HCl$ $2\ Si_{surface}\text{-OH} + (CH_3)_3SiNHSi(CH_3)_3 \rightarrow 2\ Si_{surface}\text{-O-Si}(CH_3)_3 + NH_3$ $Si_{surface}\text{-OH} + (CH_3)_3SiNHCOCH_3 \rightarrow Si_{surface}\text{-O-Si}(CH_3)_3 + H_2NCOCH_3$ a) $Si_{surface}\text{-OH} + SiCl_4 \rightarrow Si_{surface}\text{-O-SiCl}_3 + HCl$ b) $Si_{surface}\text{-O-SiCl}_3 + 3\ CH_3Li \rightarrow Si_{surface}\text{-O-Si}(CH_3)_3 + 3\ LiCl$ $Si_{surface}\text{-OH} + (CH_3)_3TiCl \rightarrow Si_{surface}\text{-O-Ti}(CH_3)_3 + HCl$ In the context of surface modification, particular importance is attached to hexamethyldisilazane, and preferably to the silanes, such as dimethyldiethoxysilane, monomethyltrichloro-, dimethyldichloro- and trimethylchlorosilane, and particular preference to the alcohols, such as methanol, ethanol, propanol, isopropanol, butanol, isobutanol, pentanol and hexanol; $C_1$–$C_4$ alcohols deserve particular emphasis in this context.

Surface modification can advantageously be carried out such that, following removal of the water, the solvent-moist gel is heated together with the modifier and with free solvent preferably to reflux temperature; the solvent should of course be miscible with the modifier. For reaction with silanes, examples of suitable solvents are toluene and alcohols such as methanol, isopropanol and butanol.

Especially when carrying out esterification with alcohols, a two-stage process regime is advisable in which first the water is exchanged for the alcohol and then the alcohol-containing gel is heated in free alcohol in the presence of an acid, which should as far as possible be anhydrous, such as toluenesulfonic acid, hydrogen chloride or concentrated sulfuric acid. Silylation can also be carried out advantageously in the presence of an acid.

In the case of the esterification it is advisable to remove the water of reaction that is formed by flushing with the alcohol or, if desired, with the solvent that is used for drying (acetone, for example). When using a water-immiscible, azeotrope-forming alcohol the water of reaction can also be removed advantageously by distillation during the reaction, in which case the extent of reaction can be monitored, with the aid of a water separator, and the alcohol can be recycled. When using a water-miscible alcohol the water can be removed with the aid of a "water carrier", such as toluene.

In the course of their subsequent drying (generally also a solvent exchange) the modified gel particles are first of all observed to shrink, but then revert rapidly to their original shape and size after all of the drying solvent has evaporated.

By surface modification in this way it is possible to prepare $SiO_2$ aerogels of particularly low density (generally <0.2 g/cm³, in particular <0.1 g/cm³) which when modifiers having hydrophobic radicals Z (in the case of the alcohols, for example, isopropoxy and butoxy) are used are hydrophobic at the same time.

It is of course also possible to hydrophobicize the non-surface-modified aerogels described above by subsequent reaction, for example, with gaseous organometal halides, especially $R^1_{4-n}SiCl_n$, at subatmospheric pressure.

EXAMPLES

Subcritical drying without surface modification

Example 1

120 ml of a sodium waterglass solution having an $SiO_2$ concentration of 1.7 mol/l were first of all introduced with stirring into 500 ml of an acidic ion exchanger resin (Wofatit® KPS, Chemie AG, Bitterfeld-Wolfen) and, after 10 minutes, were decanted. The resulting sol (pH 2.5) was adjusted to a pH of 5.8 by adding concentrated aqueous ammonia solution, and was sprayed into liquid paraffin to form sol beads of 3 mm in diameter.

The hydrogel beads formed by gelling were rinsed with water, placed in 250 ml of an aqueous solution of polysilicic acid with an $SiO_2$ concentration of 1.7 mol/l, which was then adjusted to a pH of 9.8 by adding concentrated aqueous ammonia solution, heated to 90° C. and held at this temperature for 10 minutes.

Figure 2:
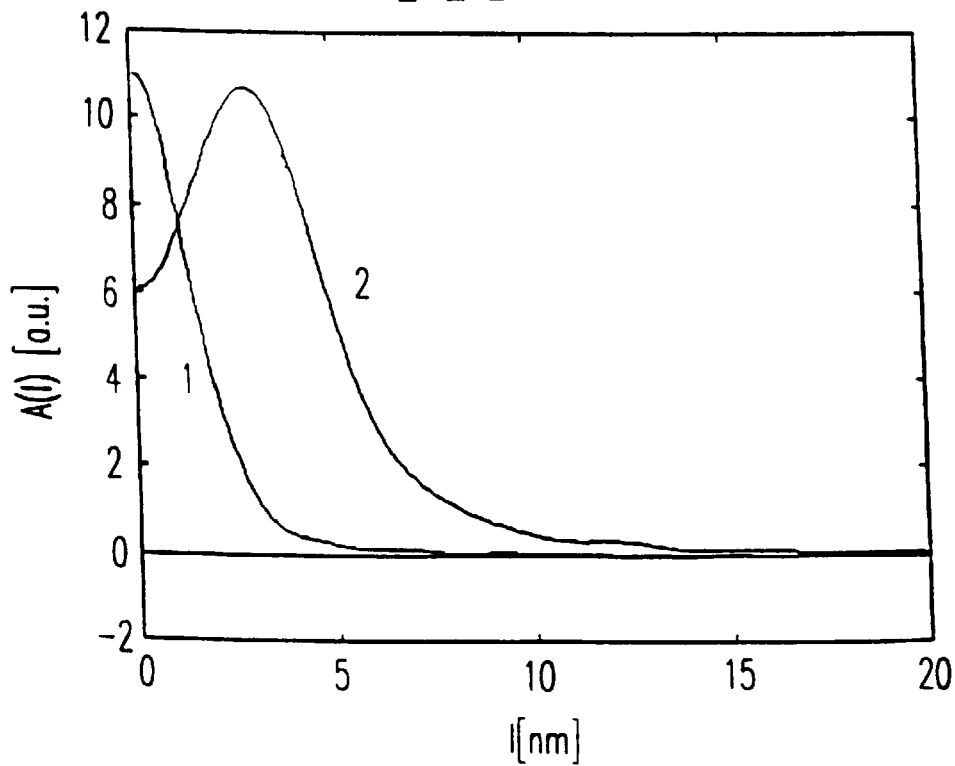
FIG. 2 is a plot of the chordal distributions of the plots of FIG. 1.

The plots (FIG. 1) obtained in the SAXS measurement (small angle X-ray scattering) for the hydrogel before (1) and after (2) the treatment with the polysilicic acid, and the chordal distributions calculated from these plots (FIG. 2), show clearly that the treatment with the polysilicic acid brought about reinforcement of the $SiO_2$ framework which is otherwise only possible by weeks of ageing.

After cooling to room temperature, the hydrogel beads were introduced into a mixture of 400 ml of ethanol and 1000 ml of toluene and were heated to a temperature above the boiling temperature of the ternary azeotrope. Distillation was continued until (4 h) the temperature had risen to the boiling point of toluene (110.6° C.). The gel beads were then cooled, washed first with ethanol and then with acetone, and subsequently were rolled over a metal plate which was at 250° C., in such a way that each gel bead made contact with the plate, and the acetone evaporated in about 20 seconds in each case.

An SiO2 aerogel having a bulk density of about 0.3 g/cm$^3$ was obtained.

Figure 3:
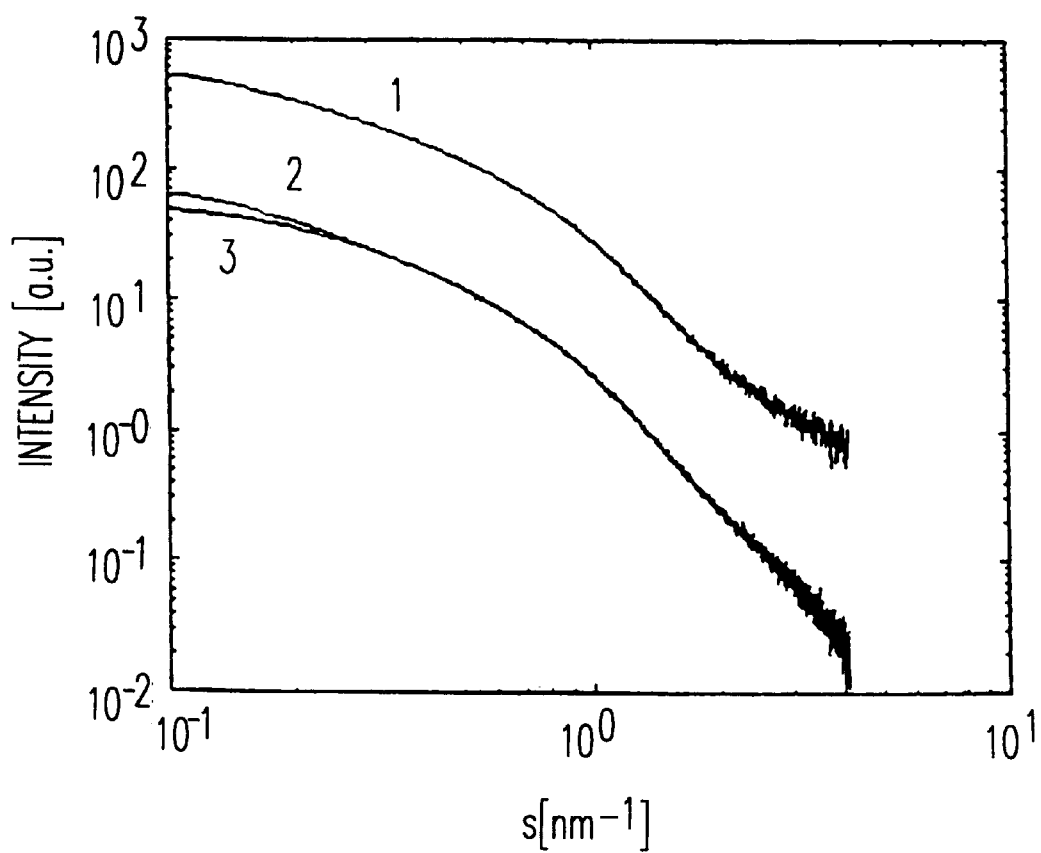

The SAXS measurements (FIG. 3) show that the internal structure of the hydrogel has been retained, and only pores of >13 nm in diameter have been destroyed.

The plot (1) corresponds here to the polysilicic acid-treated hydrogel. The plot (3) was obtained for the aerogel produced from this hydrogel. The plot (2) corresponds to the aerogel that was surface-modified prior to drying, in accordance with Example 11.

Example 2

The procedure of Example 1 was repeated but using a waterglass solution with an SiO$_2$ concentration of 3.1 mol/l.

An SiO$_2$ aerogel having a bulk density of 0.2 g/cm$^3$ was obtained.

Example 3

A mixture of 700 ml of drip-dried SiO$_2$ hydrogel granules with a mean particle diameter of 3 mm, which had been prepared in accordance with Example 1 of WO-A-95/06617 and had been washed free from salt (Na$^+$ content: 0.89 g/l) and 1700 ml of n-butanol was heated in a 2 l glass flask to 100° C.; in other words, a temperature above the boiling temperature of the azeotropic mixture but below the boiling point of pure n-butanol. Over 12 h it was possible to remove 452 ml of water by distillation in this way.

After cooling to room temperature, the n-butanol in the gel granules was exchanged for n-pentane by washing. The gel granules were then dried as in Example 1.

A clear, transparent SiO$_2$ aerogel having a Rayleigh scattering typical of aerogels, a limited hydrophobic reaction and the following properties was obtained: bulk density= 0.140 g/cm$^3$; thermal conductivity λ (23° C.)=0.022 W/m·K; transmission (600 nm)=66%.

The thermal conductivities indicated in the examples were measured at a mean temperature of 23° C. using the λ-control instrument from Hesta.

The transmission measurements were made on 10 mm thick aerogel beds under 8°/diffuse measurement geometry using the Cary 14 instrument from Cary, at a wavelength of 600 nm.

Examples 4 to 8

The procedure of Example 3 was repeated but replacing the water not by n-butanol but by the solvents indicated in the following table.

| Example | Solvent for the water exchange | Bulk density of the resulting SiO$_2$ aerogel |
|---|---|---|
| 4 | Toluene | 0.143 g/cm$^3$ |
| 5 | Ethyl acetate | 0.152 g/cm$^3$ |
| 6 | Isobutanol | 0.138 g/cm$^3$ |
| 7 | n-Hexanol | 0.206 g/cm$^3$ |
| 8 | n-Pentanol | 0.179 g/cm$^3$ |

Example 9

700 ml of SiO$_2$ hydrogel granules which had been allowed to drip dry and then washed free from salt (Na$^+$ content 0.89 g/l, mean particle diameter 3 mm), produced by the procedure of Example 1 of WO-A-95/06617, were flushed with isopropanol in a 2 l glass column commonly employed for experimental chromatography until the density of the pure alcohol (0.785 g/l) was present at the outlet from the exchange column.

The isopropanol present in the gel granules was then replaced by n-pentane (density at the column outlet: 0.626 g/l). The gel granules were then dried as in Example 1, but at 180° C.

This gave an SiO$_2$ aerogel having a bulk density of 0.148 g/l, a thermal conductivity λ (23° C.) of 0.023 W/m·K and a transmission (600 nm) of 66%.

Example 10

As in Example 9, 1.2 l of SiO$_2$ hydrogel granules were flushed with methanol until the density at the column outlet was 0.791 g/l.

The methanol-containing gel granules were then dried as in Example 1 but at 200° C.

This gave an SiO$_2$ aerogel having a bulk density of 0.201 g/cm$^3$, a thermal conductivity λ (23° C.) of 0.031 W/m·K and a transmission (600 nm) of 66%.

Subcritical drying with surface modification

Example 11

The procedure of Example 1 was repeated except that, after the azeotropic distillation, 12 g of hexamethyldisilazane were added to the hot toluene and the mixture was then slowly (over 1 h) cooled to room temperature.

A hydrophobic SiO$_2$ aerogel having a bulk density of 0.09 g/cm$^3$ was obtained. The SAXS measurements (plot 2 in FIG. 3; for comparison: plot 1: hydrogel treated with polysilicic acid, and plot 2: aerogel obtained from this hydrogel without surface modification) show that the internal structure of the hydrogel has been retained even for pores of >13 nm in diameter.

Example 12

The procedure of Example 11 was repeated but using, as in Example 2, a waterglass solution with an SiO$_2$ concentration of 3.1 mol/l.

A hydrophobic SiO$_2$ aerogel having a bulk density of 0.2 g/cm$^3$ was obtained.

Example 13

700 ml of SiO$_2$ hydrogen granules that had been left to drip dry and then washed free from salt were flushed with methanol as in Example 10.

The methanol-containing gel was then transferred to a 2 l glass flask with dropping funnel and reflux condenser. Following the addition of 280 ml of methanol, there were added in succession 37.3 ml of dimethyldiethoxysilane and 28 ml of concentrated sulfuric acid. The reaction mixture was then heated at reflux temperature for 3 h.

After cooling to room temperature and further transfer of the gel granules to an exchange column, the granules were washed with 7 l of methanol in order to remove the sulfate ions and the water, for 6.75 h. The gel granules were then dried as in Example 1 but at 200° C.

This gave a hydrophobic SiO$_2$ aerogel which had a blue glimmer when viewed under incident light and had a bulk density of 0.122 g/cm$^3$, a thermal conductivity λ (23° C.) of 0.019 W/m·K and a transmission (600 nm) of 71%.

Example 14

The procedure of Example 13 was repeated but using isopropanol instead of methanol.

This gave a hydrophobic $SiO_2$ aerogel having a bulk density of 0.102 g/cm$^3$.

Example 15

A mixture of 700 ml of isopropanol-containing gel granules obtained as in Example 14 with 700 ml of isopropanol was admixed dropwise with 46.6 ml of dimethyldichlorosilane and then heated under reflux for 4 h.

After cooling to room temperature and flushing with isopropanol, the isopropanol was replaced by n-pentane. The gel granules were then dried as in Example 1 but at 200° C.

This gave a clear, hydrophobic $SiO_2$ aerogel having a bulk density of 0.118 g/cm$^3$, a thermal conductivity λ (23° C.) of 0.020 W/m·K and a transmission (600 nm) of 65%.

Example 16

A mixture of 700 ml of $SiO_2$ hydrogel granules that had been allowed to drip dry, had been prepared by the method of Example 1 of WO-A-95/06617 and had been washed free from salt (Na$^+$ content: 0.89 g/l) with 1166 ml of n-butanol was heated in a 2 l glass flask to a temperature above the boiling temperature of the azeotropic mixture but below the boiling point of pure n-butanol. In this way, 400 ml of water were removed over 3 h.

Following the addition of 68 ml of hexamethyldisilazane, heating was continued for 3 h under reflux. Then water was removed until the density of the pure alcohol (0.81 g/l) was obtained.

Following the replacement of n-butanol by n-pentane, the gel granules were dried as in Example 1 but at 200° C.

This gave a clear, transparent $SiO_2$ aerogel having a bulk density of 0.144 g/cm$^3$, a thermal conductivity λ (23° C.) of 0.0205 W/m·K and a transmission (600 nm) of 69%.

Example 17

A mixture of 10 ml of a sodium waterglass solution having an $SiO_2$ concentration of 6.3 mol/l and 25 ml of water was added dropwise to 100 ml of an acidic ion exchanger resin (Wofatit KPS, Chemie AG, Bitterfeld-Wolfen) to which 30 ml of water had been added. After about 10 minutes the sol (pH 2.2) was decanted and adjusted to a pH of 5.8 by addition of concentrated aqueous ammonia solution. Gel formation took place within a few minutes.

The resulting gel mass was then heated in a closed vessel to 95° C. and held at this temperature for 1 h.

After cooling, the gel mass was broken down into fragments measuring about 3 mm×3 mm which were heated in 650 ml of n-butanol for azeotropic removal of the water (4 h).

Then hydrogen chloride was passed into the distillation flask for 5 minutes. After heating the contents of the flask for 15 hours at a temperature between the boiling temperature of the n-butanol/water azeotrope and the boiling point of the pure n-butanol, they were cooled to room temperature.

The gel granules were then flushed with acetone and subsequently, in a preheated crucible, were placed for 20 seconds in an oven heated to 260° C.

The gel particles shrank considerably in the course of this heating and turned white. After full evaporation of the acetone, they reverted rapidly to their original shape and size.

A hydrophobic $SiO_2$ aerogel with a bulk density of 0.09 g/cm$^3$ was obtained, which floats on water for 4 d.

Example 18

The procedure of Example 17 was repeated but using 6.5 g of toluenesulfonic acid as catalyst instead of hydrogen chloride.

A hydrophobic $SiO_2$ aerogel with a bulk density of 0.09 g/cm$^3$ was obtained, which floats on water for 4 d.

Example 19

1 l of $SiO_2$ hydrogel granules that had been left to drip dry and washed free from salt were flushed with isopropanol as in Example 9.

The isopropanol-containing gel granules were then transferred to a round-bottomed flask with reflux condenser. Following the addition of a solution of 25 g of toluenesulfonic acid in 250 l of isopropanol, the mixture was heated at boiling temperature for 10.25 h.

On cooling to room temperature, the gel granules were flushed with 5 l of acetone for 5 h (outlet density 0.79 g/l). The gel granules were then dried as in Example 1.

This gave an $SiO_2$ aerogel having a bulk density of 0.146 g/cm$^3$.

Example 20

700 ml of $SiO_2$ hydrogel granules that had been left to drip dry and washed free from salt were flushed with isopropanol as in Example 9.

The isopropanol-containing gel granules were heated under reflux for 7 h together with a further 100 ml of isopropanol and with 75 ml of concentrated sulfuric acid.

On cooling to room temperature the gel granules were rinsed with isopropanol until the sulfate ions introduced had been removed (negative test reaction with barium chloride). The isopropanol present in the gel granules was then replaced by n-pentane. Subsequently, the gel granules were dried as in Example 1 but at 200° C.

This gave a pale yellow but transparent $SiO_2$ aerogel having a bulk density of 0.141 g/cm$^3$, a thermal conductivity of 0.0214 W/m·K and a transmission (600 nm) of 71%.

We claim:

1. In a process for preparing inorganic aerogel granules based on oxides of at least one metal selected from the group consisting of magnesium, aluminum, silicon, tin, lanthanum, titanium, zirconium, chromium and thorium by producing hydrogel granules in a sol-gel process, replacing the water in the hydrogel granules by an organic solvent, removing the organic solvent from the hydrogel to produce a solvent moist hydrogel, and drying the solvent moist gel granules, the improvement comprising:

very rapidly drying the gel granules by heating the solvent-moist gel to a temperature above the normal atmospheric pressure boiling point of the solvent but below its pyrolysis temperature and at a pressure which is below the supercritical pressure of the solvent thereby rapidly evaporating remaining solvent within 20 seconds, and recovering a dried granule product.

2. The process of claim 1, wherein the temperature of heating ranges from 130–330° C. above the normal atmospheric pressure boiling point of the solvent.

3. The process of claim 1, wherein essentially ion constituent free hydrogel granules are prepared by:

i) contacting an aqueous solution of a hydrolyzable salt of said metal, in which the metal is present as a metallate, with an ion exchange material, thereby removing foreign ions from the solution; and then ii) converting the ion free gel granules to hydrogel granules in a sol-gel process.

4. The process as claimed in claim 1, wherein essentially ion constituent free hydrogel granules are prepared by:

i) preparing hydrogel granules from an aqueous solution of the metal; and ii) washing the granules with an electrolyte free water thereby removing foreign ions from the granules.

5. The process of claim 1, wherein the hydrogel granules are prepared directly by spraying said sol into the form of beads or subsequently by mechanical comminution of the resulting gel particles.

6. The process of claim 1, wherein the solid framework of the hydrogel granules is reinforced by redissolution in an Ostwald ripening process.

7. The process of claim 1, wherein the water in the hydrogel particles is replaced by an organic solvent which is soluble in water and/or forms an azeotrope with water.

8. The process of claim 7, wherein the water in the hydrogel granules is removed by flushing the hydrogel granules with said organic solvent or by azeotropic distillation.

9. The process of claim 1, wherein said organic solvent is a member selected from the group consisting of a $C_{1-6}$-aliphatic alcohol, an aliphatic $C_{1-6}$-carboxylic acid $C_{1-8}$-alkyl ester, toluene, acetone, chloroform and mixtures thereof.

10. The process of claim 1, wherein in the event the solvent employed to replace water in the granules has a normal atmospheric pressure boiling point of >100° C., this solvent is replaced with an organic solvent which boils at a temperature $\leq 100°$ C.

11. The process of claim 10, wherein the lower boiling solvent is a member selected from the group consisting of a $C_{1-3}$ alcohol, diethylether, acetone, n-pentane and n-hexane.

12. The process as claimed in claim 1, wherein the hydroxyl groups attached to the metal atoms on the internal gel surfaces, following the removal of water from the granules, are reacted with a chemical compound which does not itself undergo polymerization, thereby preventing further condensation of the metal oxide during drying.

13. The process of claim 12 wherein the OH groups attached to the metal atoms are esterified with $C_1$–$C_6$ alcohols, silylated with silanes of the formula $R^1_{4-n}Si(OR^2)_n$ or $R^1_{4-n}SiCl_n$, where n is 1–3 and $R^1$ and $R^2$ independently of one another are $C_1$–$C_6$-alkyl, cyclohexyl or phenyl, with hexamethyldisilazane or with trimethylsilylacetamide, or are first of all reacted with tetrachlorosilane and then with metal organyls which contain the above-mentioned radicals $R^1$.

14. The process of claim 13, wherein, after replacing the water of the granules with a $C_{1-6}$ alcohol, the hydroxyl groups of the metal atoms of the gel are esterified with the alcohol in the presence of an acid catalyst and optionally removing the water produced by esterification by distillation.

15. A process as claimed in claim 1, which is applied to the preparation of $SiO_2$ aerogel granules.

16. In a process for preparing inorganic aerogel granules based on oxides of at least one metal selected from the group consisting of magnesium, aluminum, silicon, tin, lanthanum, titanium, zirconium, chromium and thorium by producing hydrogel granules in a sol-gel process, replacing the water in the hydrogel granules by an organic solvent, removing the organic solvent from the hydrogel granules to produce a solvent moist hydrogel, and drying the solvent moist gel granules, the improvement comprising:

very rapidly drying the gel granules by contacting the solvent-moist gel with a heated surface at a temperature above the normal atmospheric pressure boiling point of the solvent but below its pyrolysis temperature and at a pressure which is below the supercritical pressure of the solvent, thereby rapidly evaporating solvent remaining in the gel granules, and recovering a dried granule product.

17. The process of claim 16, wherein the temperature of heating ranges from 130–330° C. above the normal atmospheric pressure boiling point of the solvent.

18. The process of claim 16, wherein essentially ion constituent free hydrogel granules are prepared by:

i) contacting an aqueous solution of a hydrolyzable salt of said metal, in which the metal is present as a metallate, with an ion exchange material, thereby removing foreign ions from the solution; and then ii) converting the ion free gel granules to hydrogel granules in a sol-gel process.

19. The process as claimed in claim 16, wherein essentially ion constituent free hydrogel granules are prepared by:

i) preparing hydrogel granules from an aqueous solution of the metal; and ii) washing the granules with an electrolyte free water thereby removing foreign ions from the granules.

20. The process of claim 16, wherein the hydrogel granules are prepared directly by spraying said sol into the form of beads or subsequently by mechanical comminution of the resulting gel particles.

21. The process of claim 16, wherein the solid framework of the hydrogel granules is reinforced by redissolution in an Ostwald ripening process.

22. The process of claim 16, wherein the water in the hydrogel particles is replaced by an organic solvent which is soluble in water and/or forms an azeotrope with water.

23. The process of claim 22, wherein the water in the hydrogel granules is removed by flushing the hydrogel granules with said organic solvent or by azeotropic distillation.

24. The process of claim 16, wherein said organic solvent is a member selected from the group consisting of a $C_{1-6}$-aliphatic alcohol, a $C_{1-6}$-aliphatic carboxylic acid $C_{1-8}$-alkyl ester, toluene, acetone, chloroform and mixtures thereof.

25. The process of claim 16, wherein, in the event the solvent employed to replace water in the granules has a normal atmospheric pressure boiling point of >100° C., this solvent is replaced with an organic solvent, prior to drying, which boils at a temperature $\leq 100°$ C.

26. The process of claim 25, wherein the lower boiling solvent is a member selected from the group consisting of a $C_{1-3}$ alcohol, diethylether, acetone, n-pentane and n-hexane.

27. The process as claimed in claim 16, wherein the hydroxyl groups attached to the metal atoms on the internal gel surfaces, following the removal of water from the granules, are reacted with a chemical compound which does not itself undergo polymerization, thereby preventing further condensation of the metal oxide during drying.

28. The process of claim 27, wherein the OH groups attached to the metal atoms are esterified with C1–C6 alcohols, silylated with silanes of the formula $R^1_{4-n}Si(OR^2)_n$ or $R^1_{4-n}SiCl_n$, where n is 1–3 and $R^1$ and $R^2$ independently of one another are $C_1$–$C_6$-alkyl, cyclohexyl or phenyl, with hexamethyldisilazane or with trimethylsilylacetamide, or are first of all reacted with tetrachlorosilane and then with metal organyls which contain the above-mentioned radicals $R^1$.

29. The process of claim 28, wherein, after replacing the water of the granules with a $C_{1-6}$ alcohol, the hydroxyl groups of the metal atoms of the gel are esterified with the alcohol in the presence of an acid catalyst and optionally removing the water produced by esterification by distillation.

30. A process as claimed in claim 16, which is applied to the preparation of $SiO_2$ aerogel granules.

* * * * *